Aug. 25, 1959   A. BAUMANN   2,901,082
CONVEYOR SYSTEM
Filed May 16, 1957   3 Sheets-Sheet 1
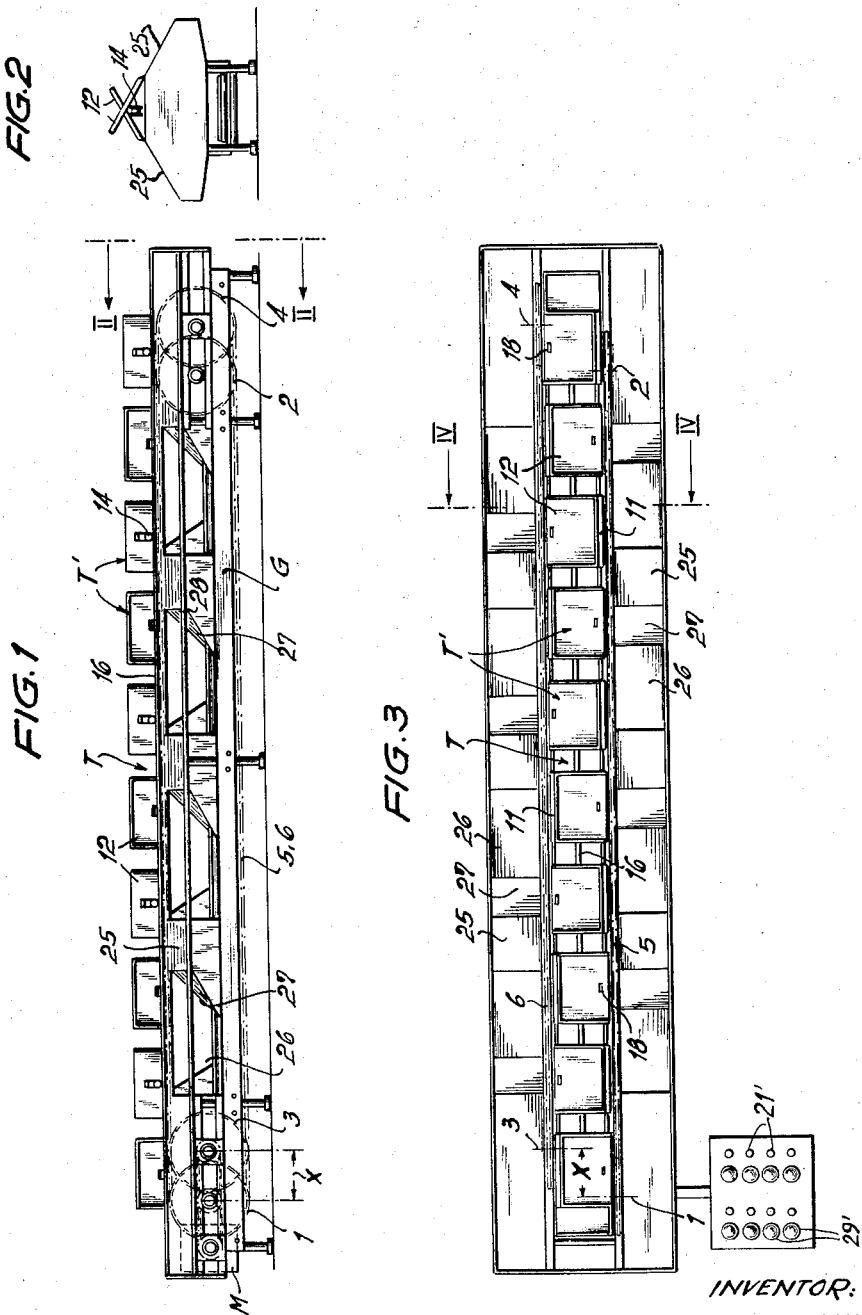
INVENTOR:
ALBERT BAUMANN
BY Karl F. Ross
AGENT

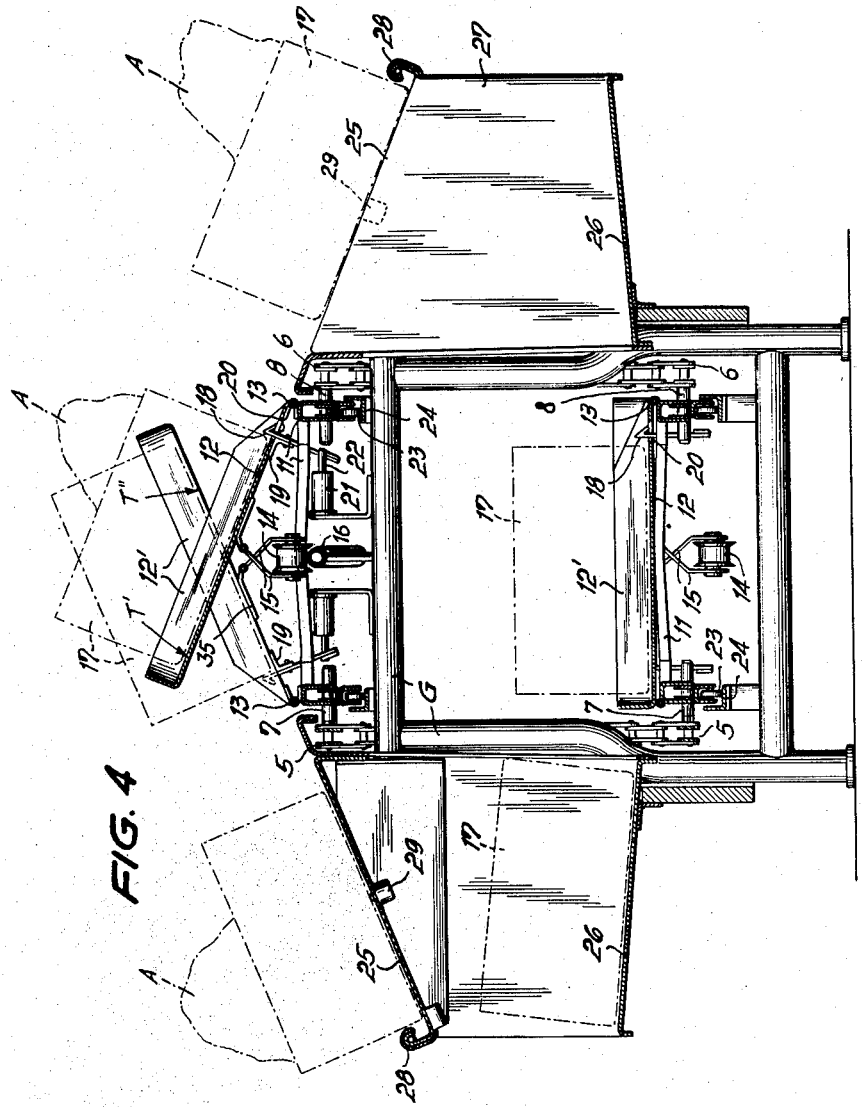

Aug. 25, 1959     A. BAUMANN     2,901,082
CONVEYOR SYSTEM

Filed May 16, 1957     3 Sheets-Sheet 3

INVENTOR:
ALBERT BAUMANN

BY
AGENT

United States Patent Office 2,901,082
Patented Aug. 25, 1959

2,901,082
CONVEYOR SYSTEM

Albert Baumann, Bielefeld, Germany, assignor to Durkoppwerke Aktiengesellschaft, Bielefeld, Germany, a corporation of Germany Application May 16, 1957, Serial No. 659,501

9 Claims. (Cl. 198—19)

The present invention relates to a conveyor system designed to transport raw materials and unfinished goods in various stages of production to a number of work stations of a manufacturing plant.

In various industries, such as the garment and shoe industries, it is not always practical to use conventional conveyor systems of the assembly-line type in which the work pieces are transported in continuous or intermittent motion from one station to the next, to be operated upon at each location according to an invariable routine. In the industries referred to, changes in style as well as seasonal requirements call for frequent readjustments in working procedure so that an assembly line operating with inflexible schedule is often uneconomical.

The invention has for its principal object the provision of a less rigid conveyor system enabling the simultaneous routing of various lines of production items to their proper work stations, in larger or smaller lots according to demand, and in whatever order may be momentarily required under a flexible assembly program. A more specific object of the invention is to provide means in such a conveyor system whereby the routing of the work pieces is at all times under the direct control of supervisory personnel stationed at a suitable control post, e.g. at a location near the feeding end of the conveyor. A further specific object of the invention is to provide a conveyor system of the character referred to wherein the work pieces, upon having been routed to a particular station, may readily be removed from the conveyor at such station and subjected to operations of indeterminate duration (e.g. cutting, sewing) without interfering with the flow of goods to and from other stations along the conveyor. Still another object is to provide a conveyor system adapted, under the control of the supervisor, to keep each station adequately supplied with goods, according to the capacity of the operator manning the station, so as to reduce to a minimum the amount of time lost by waiting and to allow operations to proceed on a piece-work basis if desired.

In accordance with a feature of the invention the conveyor is in the form of an endless band, preferably constituted by a pair of parallel chains bridged by a series of supporting members or carriages, traveling in a vertical plane so as to have an upper and a lower run, one run (preferably the upper) serving to distribute goods from a loading station to a plurality of work stations along the conveyor, the other run serving to return the goods from the work stations to the loading station. At a central control post, generally at the loading station, a set of buttons or other means are provided for selectively operating a distributing mechanism at any of the carriages; this causes delivery of an article carried thereby, e.g. a box containing unfinished goods of a particular description, to an operator at a selected work station.

According to a more specific feature of the invention the carriages of the conveyor are equipped with tiltable, preferably tray-shaped platforms, there being provided along the upper conveyor run a guiding element serving to tip these platforms into an inclined position in which the articles (or the receptacles therefor) carried thereon will slide off toward an adjacent work station upon the release of a detent forming part of the distributing mechanism. Advantageously, alternate platforms are hinged to opposite conveyor sides so that the platforms of the odd-numbered carriages will tilt toward the right and those on the even-numbered carriages toward the left, or vice versa, whereby the work stations may be arranged on both sides of the conveyor. Each work station, preferably, comprises an inclined receiving surface, in line with the tilted conveyor platform, and a storing surface on which the box or other article may be deposited during processing and from which the article may be conveniently pushed onto the lower conveyor run for return to the loading station.

The above and other objects, features and advantages of the invention will become more fully apparent from the following detailed description of a preferred embodiment, reference being had to the accompanying drawing in which:

Fig. 1 is a side-elevational view of a conveyor system according to the invention;

Fig. 2 is an end view taken on the line II—II of Fig. 1;

Fig. 3 is a top plan view of the system shown in Figs. 1 and 2;

Fig. 4 is a sectional view, drawn to a larger scale, taken on the line IV—IV of Fig. 3;

Figure 5:
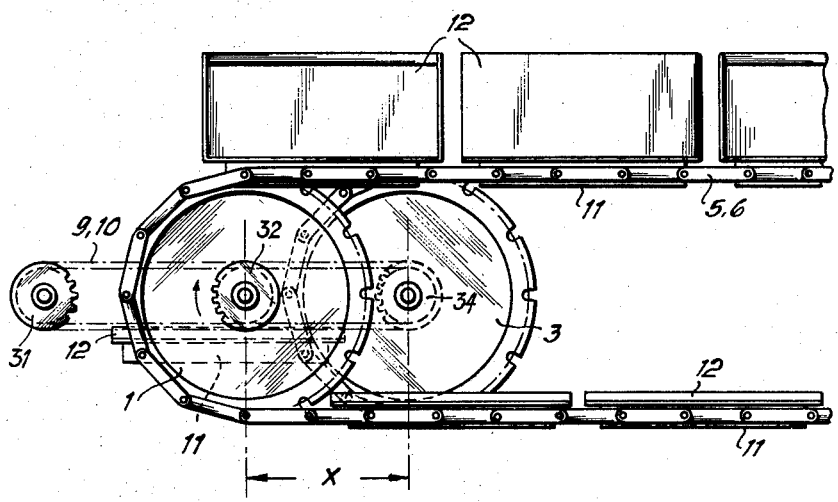
Fig. 5 is an enlarged elevational view of the left-hand end of the conveyor system of Fig. 1.
Figure 6:
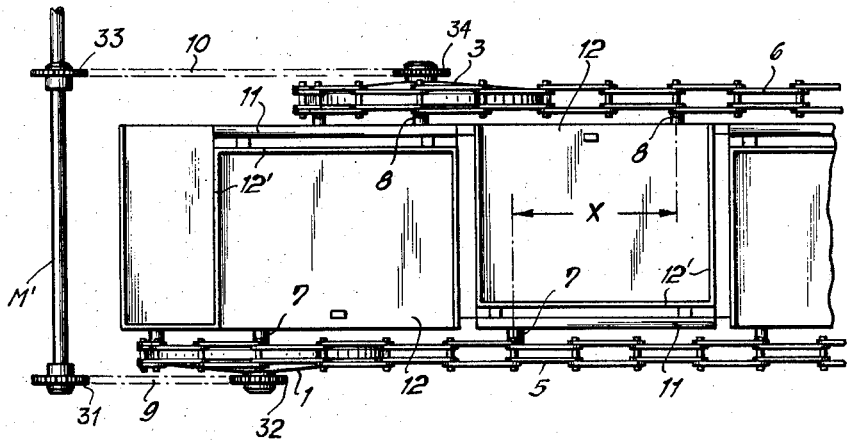
Fig. 6 is a top plan view of the elements shown in Fig. 5.

The system shown in the drawing comprises an endless conveyor, generally designated T, driven by a motor M illustrated schematically in Fig. 1. The conveyor T consists of two endless chains 5 and 6, passing around sprockets 1, 2 and 3, 4, respectively, which are bridged at regular intervals by carriages alternately designated T', T''. The sprockets 1, 2 of chain 5 are offset from the sprockets 3, 4 of chain 6, in longitudinal direction of the conveyor, by a distance $x$ which is somewhat less than the length of a carriage T' or T''. Each of these carriages comprises a frame 11 secured by diagonally opposite gudgeons 7 and 8 to the chains 5 and 6, respectively, the longitudinal displacement between these gudgeons being equal to the distance $x$ whereby the frame 11 will maintain its horizontal position as it passes from the lower run of conveyor T around sprockets 1, 3 onto the upper run thereof (as best seen in Fig. 5) and back again onto the lower run around sprockets 2, 4. The driving connection between the motor M and the conveyor comprises a first roller chain 9, passing around a sprocket 31 on motor shaft M' and around a sprocket 32 on the shaft of sprocket 1, as well as a second roller chain 10, similarly interconnecting a sprocket 33 on the motor shaft and a sprocket 34 on the shaft of sprocket 3.

Hingedly secured at 13 to one of the longitudinal edges of each frame 11 is a tray-like platform 12 provided with a flange 12' along its three unhinged sides. The hinges 13 of all carriages T' are positioned above chain 5, thus on the right-hand edge of the frame as viewed in Fig. 4, those of all carriages T'' being positioned above chain 6 or at the left-hand frame edge in Fig. 4. As a result, the trays 12 of carriages T' and T'' are swingable about their hinges 13 clockwise and counterclockwise, respectively, looking in the direction of movement of conveyor T, from their normal horizontal position. A follower arm 15 is pivotally joined to a bracket 35, secured to the underside of each tray 12, and carries a roller 14 which rides up a tubular ramp 16 when the respective carriage rises from the lower run to the upper run of the conveyor in passing along the left-hand end of the chains 5, 6 as viewed in Figs. 1 and 3, thereby causing the trays to tilt alternately to the right and to the left as best seen in Figs. 2 and 4. Roller 14 leaves the ramp 16 at the right-hand conveyor end so that the trays 12 again assume their horizontal positions upon returning to the lower run at that end. Rollers 23 are journaled in the channeled side members of each frame 11, as likewise apparent from Fig. 4, and travel on endless rails 24 of L-shaped cross-section extending alongside the chains 5 and 6; this arrangement dispenses with the need for any special guides for the chains.

Mounted on the frame G on both sides of the conveyor T are elongated work benches, e.g. of sheet metal, defining a series of operator's stations each having a markedly inclined receiving surface 25 adjacent the upper run of the conveyor, a slightly inclined storing surface 26 adjacent the lower run of the conveyor and a sloping connecting surface 27 therebetween. The receiving surfaces 25, which form a continuation of the trays 12 in their tilted positions, are provided at their lower longitudinal edges with raised rims 28 joined together to form a continuous rail extending over the full length of each work bench. A receptacle delivered by one of the carriages T' or T" to one of these work stations, such as a box indicated schematically at 17, will come to rest against rim 28 after sliding from the tilted tray 12 onto the receiving surface 25; from there it can be moved by the operator, via slope 27, onto the storing surface 26 whereupon another such article may be deposited by the conveyor on surface 25.

The selective delivery of the boxes 17, carrying articles A, to the different work stations is controlled by a detent mechanism comprising a lever 18 pivoted onto a bracket 19 on the underside of tray 12 and swingable within a slot 20 of the tray. This lever is normally held (for example by its own weight) in an operative position in which its tip projects upwardly beyond slot 20 and blocks the path of box 17 so that the latter is prevented from sliding off the tray 12. A solenoid 21 adjacent each work station is operable to position its armature 22 in the path of lever 18 so that the latter is tripped and swings in a plane parallel to hinges 13 as the tray 12 passes above this armature. By this movement the tip of lever 18 is momentarily retracted into an inoperative position in which the box 17 is free to leave the tray 12 and to slide onto the receiving surface 25 of an adjacent work station. This tip, it will be noted, is wedge-shaped so as not unduly to interfere with the return of this or some other box 17 to the tray from one of the storing surfaces 26.

The operation of solenoids 21 may be controlled by a supervisor at the loading end of the conveyor by means of a set of buttons 21' as indicated schematically in Fig. 3. Next to each button there is shown provided a signal lamp 29' which lights when the operating arm of a switch 29 at a corresponding receiving surface 25 is depressed by the weight of a box 17 present thereon; as soon as this box is removed by the operator to the storing surface 26 for further servicing, the supervisor notes from the extinction of the lamp that this particular station is ready to receive additional work and proceeds to route another box 17 to that station.

It will be apparent that, depending upon the production schedule and the availability of personnel and machinery, identical or different operations may be performed at some or all of the work stations served by a conveyor system according to the invention. Thus, if desired, one type of operation may be assigned to all the workers on one side of the conveyor and another type to all those on the opposite side, it being then possible to load all the carriages T' with goods of one character and all the carriages T" with goods of a different character (e.g. in a more advanced stage of completion) for indiscriminate delivery to any idle work station served by these carriages. Differences in the positioning of the detents 18, 19 on certain trays 12 and corresponding differences in the positioning of the release mechanisms 21, 22 at certain stations enable one or more suitably marked carriages to be individually assigned to a specific station, or group of stations, whereby the proper routing of the goods will be assured even in large plants where the dispatcher cannot visually ascertain the arrival of a particular carriage at a selected station. The speed of the conveyor is independent of the working rate of the personnel and may be selected as fast as is compatible with safe and dependable operation.

The invention is, of course, not limited to the specific embodiment described and illustrated but may be realized in various modifications or adaptations without departing from the spirit and scope of the appended claims.

I claim:

1. A conveyor system for the distribution of articles to be processed, comprising a pair of endless chains disposed in parallel vertical planes, a series of carriages bridging said chains, each of said carriages being provided with a tiltable platform adapted to hold a receptacle for said articles, said chains and said carriages together defining an elongated, endless band with an upper and a lower run, drive means for rotating said band, a plurality of work stations alongside said band, mechanism for maintaining the platform of each carriage in a tilted position during its movement past all of said stations along one of said runs, detent means on said platform normally adapted to prevent a receptacle carried thereon from sliding off said platform, and release means for selectively inactivating said detent means adjacent said stations, each of said stations being provided with an inclined receiving surface adapted to receive a receptacle sliding off said platform upon inactivation of said detent means, said mechanism comprising guide means extending along the upper run of said band and follower means on said platforms adapted to co-operate with said guide means for tilting said platforms on said upper run, each of said stations being further provided with a storing surface for said receptacles adjacent the lower run of said band, said storing surface being inclined toward said lower run at an angle substantially less than the angle of inclination of said receiving surface, each of said stations being further provided with a sloping connecting surface leading from said receiving surface to said storing surface, said drive means comprising a first pair of sprockets for one of said chains and a second pair of sprockets for the other of said chains, the sprockets of each pair being positioned at opposite ends of the respective chain, the sprockets of said first pair being longitudinally offset from the sprockets of said second pair by a given distance, each of said carriages being connected with said chains by respective gudgeons longitudinally offset from each other by said given distance whereby said carriages remain substantially horizontal upon passing around said sprockets, said platforms being thus adapted to receive on said lower run, by way of said connecting and storing surfaces, a receptacle previously deposited on the associated receiving surface by a carriage on said upper run.

2. A system according to claim 1, further comprising manually operable control means for said release means adjacent one end of said band.

3. A system according to claim 1, wherein said release means comprises a plurality of individually operable trip elements mounted adjacent respective ones of said stations, said detent means comprising a projecting blocking member adapted to be displaced to a non-blocking position by said trip elements.

4. A system according to claim 1, wherein the platforms of alternate carriages are provided with hinge means on opposite sides of said band whereby said platforms are alternately tilted in opposite directions, said work stations being divided into two groups on opposite sides of said band for respective co-operation with said alternate carriages.

5. A system according to claim 1, further comprising a control station provided with a plurality of signaling devices respectively identifying said work stations, the receiving surface of each work station being provided with switch means for operating the respective signaling device in a manner indicating presence or absence of one of said articles on said receiving surface.

6. A system according to claim 5, further comprising control means at said control station for operating said release means in accordance with the indications of said signaling devices.

7. A conveyor system for the distribution of articles to be processed, comprising an endless band having an upper and a lower horizontal run, a series of carriages supported on said band, said carriages having upwardly facing carrying surfaces adapted to hold receptacles for said articles, drive means for imparting motion to said band, a plurality of work stations alongside said band, mechanism for tilting the carrying surfaces of said carriages during their movement past said stations along said upper run, detent means on said carriages normally adapted to prevent a receptacle carried thereon from sliding off said carrying surfaces, and release means for selectively inactivating said detent means adjacent said stations, each of said stations being provided with a receiving surface inclined in substantially the same plane as said carrying surfaces in their tilted position and forming a continuation of the latter, each of said stations being further provided with a storing surface adjacent said lower run and inclined toward same at an angle substantially less than the angle of inclination of said receiving surface, each of said stations being further provided with a sloping connecting surface leading from said receiving surface to said storing surface whereby a receptacle for said articles, deposited onto said receiving surface by an oncoming carriage on said upper run, may be returned to the carrying surface of an outgoing carriage on said lower run by way of said connecting and storing surfaces.

8. A conveyor system for the distribution of articles to be processed, comprising an endless band having an upper and a lower horizontal run, a series of carriages provided with trays, each carriage being so supported on said band as to have the same tray surface directed upwardly on its passage over both of said runs, drive means for imparting motion to said band, a plurality of work stations alongside said band, each of said trays having a side open toward said stations, mechanism for tilting said trays during the movement of said carriages past said stations along said upper run, a retractable arm on each of said carriages normally positioned to prevent a receptacle for said articles carried thereon from sliding off said trays, and release means for selectively retracting said arm adjacent any of said stations, each of said stations being provided with a receiving surface for said receptacle adjacent said upper run and with a storing surface adjacent said lower run for returning said receptacle to a carriage, said arm having an extremity projecting above said tray surface adjacent said open side thereof, said extremity being wedge-shaped with an outwardly facing slope enabling the return of the receptacle to said tray surface without preliminary retraction of said arm.

9. A system according to claim 8, wherein said arm is pivotable in a plane substantially parallel to the direction of movement of said upper run, said release means comprising a stationary mounting adjacent each of said stations and a movable trip member on said mounting selectively positionable in the path of said arm.

References Cited in the file of this patent

UNITED STATES PATENTS

| | | |
|---|---|---|
| 2,242,813 | Cook | May 20, 1941 |
| 2,615,424 | Spickler | Oct. 28, 1952 |
| 2,728,466 | Postlewaite et al. | Dec. 27, 1955 |

FOREIGN PATENTS

| | | |
|---|---|---|
| 651,685 | Great Britain | Apr. 4, 1951 |
| 1,133,195 | France | Nov. 12, 1956 |